US011748166B2

(12) United States Patent
Reineke et al.

(10) Patent No.: US 11,748,166 B2
(45) Date of Patent: Sep. 5, 2023

(54) METHOD AND SYSTEM FOR PRE-ALLOCATION OF COMPUTING RESOURCES PRIOR TO PREPARATION OF PHYSICAL ASSETS

(71) Applicant: EMC IP Holding Company LLC, Hopkinton, MA (US)

(72) Inventors: Nicole Reineke, Northborough, MA (US); Hanna Yehuda, Newton, MA (US); Robert Anthony Lincourt, Jr., Franklin, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 339 days.

(21) Appl. No.: 16/913,386

(22) Filed: Jun. 26, 2020

(65) Prior Publication Data

US 2021/0406084 A1 Dec. 30, 2021

(51) Int. Cl.
*G06F 9/46* (2006.01)
*G06F 9/50* (2006.01)
*G06F 11/14* (2006.01)
*G06N 20/00* (2019.01)

(52) U.S. Cl.
CPC ........ *G06F 9/5044* (2013.01); *G06F 11/1451* (2013.01); *G06F 11/1469* (2013.01); *G06N 20/00* (2019.01); *G06F 2201/84* (2013.01)

(58) Field of Classification Search
CPC .................................................... G06F 9/5044
USPC ........................................................ 718/104
See application file for complete search history.

(56) References Cited

U.S. PATENT DOCUMENTS

| 7,809,691 | B1 * | 10/2010 | Karmarkar | G06F 11/1464 |
| | | | | 707/681 |
| 8,417,578 | B1 * | 4/2013 | Evans | G06Q 30/0621 |
| | | | | 705/26.1 |
| 9,092,397 | B1 * | 7/2015 | Kurtz | G06F 11/2038 |
| 9,311,330 | B1 * | 4/2016 | Chockalingam | G06F 11/1458 |
| 11,106,369 | B1 * | 8/2021 | Farhan | G06F 11/0754 |
| 11,308,428 | B2 * | 4/2022 | Zhang | G06Q 10/06315 |
| 2004/0155108 | A1 * | 8/2004 | Saito | G07C 13/00 |
| | | | | 235/386 |
| 2006/0212671 | A1 * | 9/2006 | Todd | G06F 3/061 |
| | | | | 711/165 |
| 2011/0252208 | A1 * | 10/2011 | Ali | G06F 11/1451 |
| | | | | 718/1 |
| 2012/0149419 | A1 * | 6/2012 | Roh | H04W 48/16 |
| | | | | 455/515 |
| 2013/0080488 | A1 * | 3/2013 | Li | G06F 11/2069 |
| | | | | 707/831 |

(Continued)

*Primary Examiner* — Mehran Kamran
(74) *Attorney, Agent, or Firm* — Chamberlain, Hrdlicka, White, Williams, & Aughtry

(57) ABSTRACT

A method for managing computing resources includes obtaining, by a resource use manager, a physical asset request from a client, in response to the physical asset request: initiating allocation of a landing area device to the client based on the physical asset request, determining a physical asset to be provided to the client, sending, to a manufacturer, a physical asset preparation request, obtaining a confirmation of deployment of the physical asset from the client, performing a restoration on the physical asset using a most recent landing area incremental backup, and after the initiating the restoration, initiating a transfer of operation from the landing area device to the physical asset.

20 Claims, 8 Drawing Sheets

(56) References Cited

U.S. PATENT DOCUMENTS

| | | | |
|---|---|---|---|
| 2013/0185299 A1* | 7/2013 | Landry | G06F 16/93 |
| | | | 707/736 |
| 2013/0254588 A1* | 9/2013 | Fujieda | G06F 11/2023 |
| | | | 714/4.11 |
| 2015/0095404 A1* | 4/2015 | Perlman | H04L 67/1034 |
| | | | 709/203 |
| 2016/0057224 A1* | 2/2016 | Ori | G06F 3/065 |
| | | | 709/213 |
| 2016/0124818 A1* | 5/2016 | Wang | G06F 11/1451 |
| | | | 714/4.12 |
| 2016/0373523 A1* | 12/2016 | Kim | H04L 67/303 |
| 2017/0126812 A1* | 5/2017 | Singhal | H04L 67/01 |
| 2017/0132095 A1* | 5/2017 | Graefe | G06F 11/1662 |
| 2017/0262196 A1* | 9/2017 | Hirose | G06F 3/0607 |
| 2018/0011730 A1* | 1/2018 | Zembutsu | H04L 41/0836 |
| 2019/0007416 A1* | 1/2019 | Ackley | G06F 11/3006 |
| 2019/0146887 A1* | 5/2019 | Blea | G06F 11/2023 |
| | | | 714/4.11 |
| 2019/0354283 A1* | 11/2019 | Rowstron | G06F 3/061 |
| 2020/0159610 A1* | 5/2020 | Anger | G06F 11/0793 |
| 2020/0327017 A1* | 10/2020 | Vijayan | G06F 11/1451 |
| 2020/0372163 A1* | 11/2020 | Chung | H04L 9/0631 |
| 2020/0379660 A1* | 12/2020 | Ciudad | G06F 3/067 |
| 2020/0379946 A1* | 12/2020 | Coffman | G06F 3/0652 |
| 2020/0409803 A1* | 12/2020 | Naidu | G06F 11/1464 |
| 2021/0247923 A1* | 8/2021 | Kanapata | G06F 3/061 |
| 2021/0342237 A1* | 11/2021 | Polimera | G06F 9/45558 |
| 2021/0398013 A1* | 12/2021 | Liu | G06F 9/50 |
| 2021/0406084 A1* | 12/2021 | Reineke | G06Q 30/0633 |
| 2022/0095684 A1* | 3/2022 | Ferrie | A46B 15/0055 |

* cited by examiner

METHOD AND SYSTEM FOR PRE-ALLOCATION OF COMPUTING RESOURCES PRIOR TO PREPARATION OF PHYSICAL ASSETS

BACKGROUND

Systems may include multiple computing devices. Each computing device may include computing resources. The computing resources may not be instantly available to a client after a request for use by the client.

SUMMARY

In general, in one aspect, the invention relates to a method for managing physical assets. The method includes obtaining, by a resource use manager, a physical asset request from a client, in response to the physical asset request: initiating allocation of a landing area device to the client based on the physical asset request, determining a physical asset to be provided to the client, sending, to a manufacturer, a physical asset preparation request, obtaining a confirmation of deployment of the physical asset from the client, performing a restoration on the physical asset using a most recent landing area incremental backup, and after the initiating the restoration, initiating a transfer of operation from the landing area device to the physical asset.

In general, in one aspect, the invention relates to a non-transitory computer readable medium comprising computer readable program code, which when executed by a computer processor enables the computer processor to perform a method. The method includes obtaining, by a resource use manager, a physical asset request from a client, in response to the physical asset request: initiating allocation of a landing area device to the client based on the physical asset request, determining a physical asset to be provided to the client, sending, to a manufacturer, a physical asset preparation request, obtaining a confirmation of deployment of the physical asset from the client, performing a restoration on the physical asset using a most recent landing area incremental backup, and after the initiating the restoration, initiating a transfer of operation from the landing area device to the physical asset.

In general, in one aspect, the invention relates to a system that includes a processor and memory that includes instructions which, when executed by the processor, perform a method. The method includes obtaining, by a resource use manager, a physical asset request from a client, in response to the physical asset request: initiating allocation of a landing area device to the client based on the physical asset request, determining a physical asset to be provided to the client, sending, to a manufacturer, a physical asset preparation request, obtaining a confirmation of deployment of the physical asset from the client, performing a restoration on the physical asset using a most recent landing area incremental backup, and after the initiating the restoration, initiating a transfer of operation from the landing area device to the physical asset.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
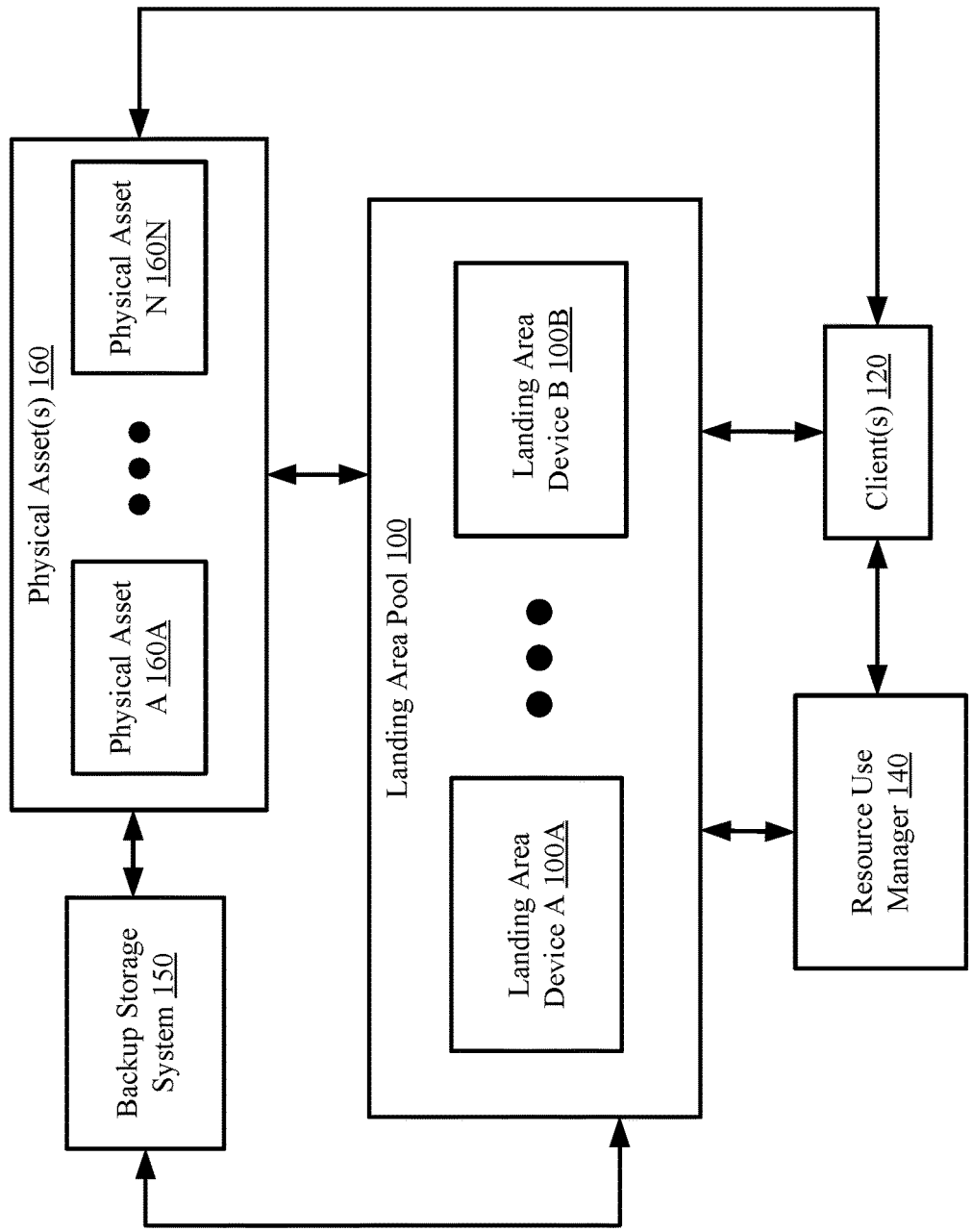
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing computing device resources. Specifically, embodiments of the invention relate to a system that enables a client to utilize computing resources relating to a request for physical assets to be deployed by the client prior to the availability of the physical assets. Embodiments of the invention may include providing landing area devices that utilize similar computing resources to that of the requested physical assets, storing the data generated by the landing area devices in a backup storage system, loading (also referred to as restoring) the backed up data onto the physical assets after the physical assets are prepared, initiating the shipping of the physical assets to a requested destination, deploying the physical assets, and loading an incremental backup onto the deployed physical assets. The incremental backup may include the data generated between the initial loading and the deployment. The operation of the landing area devices may be subsequently transferred to the deployed physical assets. The result of the transfer may include utilizing the landing area devices as a secondary storage system.

Embodiments of the invention further include utilizing machine learning to determine which physical assets to provide the clients based on: (i) the physical asset request obtained from the client, (ii) utilization of the landing area devices over a predetermined period of time, and (iii) the confirmation, by the client, of previously-determined physical assets for previous physical asset requests by the client. The determination of the physical assets may result in additional, fewer, and/or different physical assets than the physical assets specified in the physical asset request.

FIG. 1 shows a diagram of a system in accordance with one or more embodiments of the invention. The system includes a landing area pool (100), one or more clients (120), a resource use manager (140), a backup storage system (150), and one or more physical assets (160). Each component of the system may be operably connected via any combination of wired and/or wireless connections. The system may include additional, fewer, and/or different components without departing from the invention. Each component of the system illustrated in FIG. 1 is discussed below.

In one or more embodiments of the invention, the landing area pool (100) is a logical grouping of landing area devices (100A, 100B), each of which may obtain data, store data, provide data, and/or execute applications for the client(s) (120). Each landing area device (100A, 100N) may include functionality for performing any processes of the physical asset(s) (160) for a temporary period of time. The temporary period of time may be during a period of time after a physical asset has been requested and before the physical asset is available for deployment. During such period of time, computing resources and/or applications (discussed below) executing on the landing area devices (100A, 100B) may generate data that may be stored in the backup storage system (150).

Figure 5:
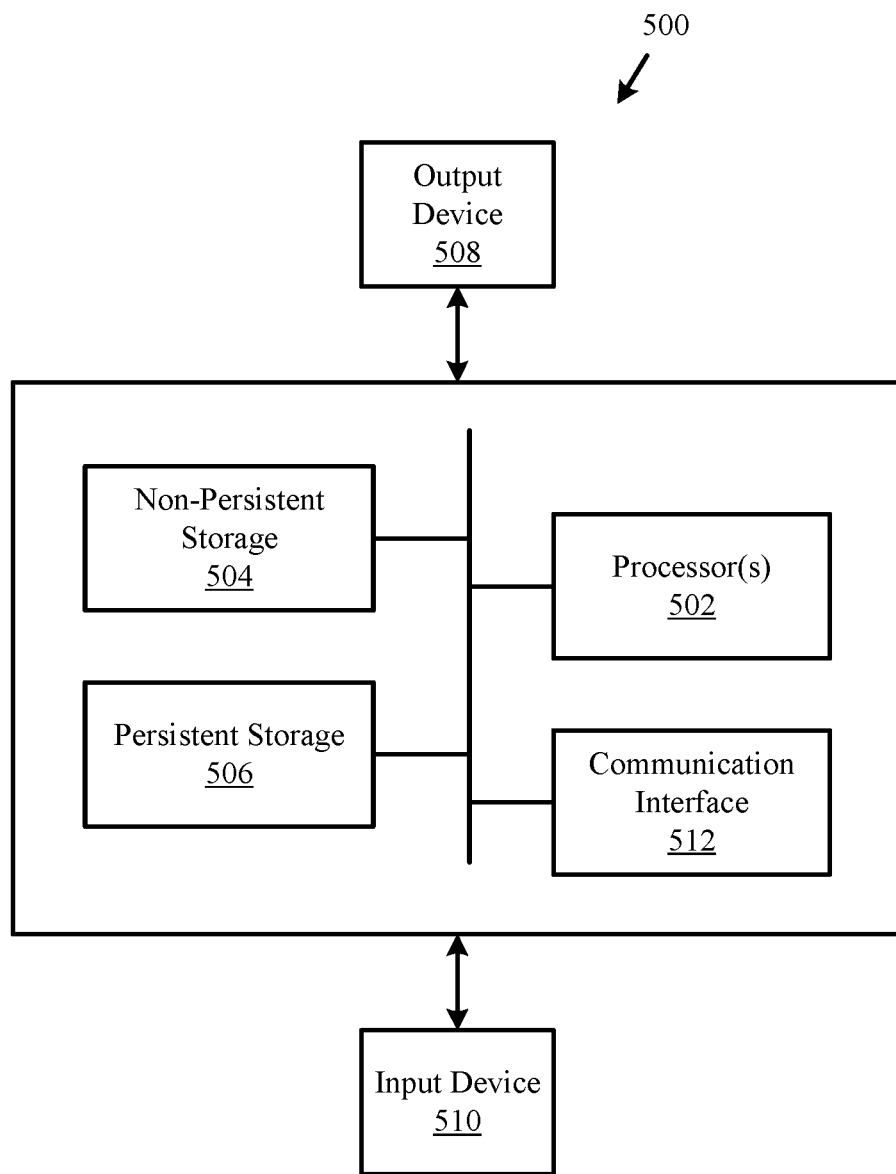
FIG. 5 shows a diagram of a computing device in accordance with one or more embodiments of the invention.

In one or more embodiments of the invention, each landing area device (100A, 100B) is implemented as a computing device (see, e.g., FIG. 5). A computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the landing area device (100A, 100B) described throughout this application and/or all, or portion, of the method illustrated in FIG. 3B. For additional details regarding a landing area device (100A, 100B), see, e.g., FIG. 2.

Each landing area device (100A, 100B) may be implemented as a logical device without departing from the invention. The logical device utilizes computing resources of any number of physical computing devices to provide the functionality of the landing area device (e.g., 100A, 100B) described throughout this application and/or all, or portion, of the methods illustrated in FIG. 3B.

In one or more embodiments of the invention, the client(s) (120) utilize the services of the resource use manager (140) and/or the landing area pool (100). Specifically, the client(s) (120) send physical asset requests to the resource use manager (140) that specifies one or more physical assets (e.g., 160). The client(s) (120) may further utilize the landing area pool (100) by accessing the computing resources and/or applications of the landing area devices (100A, 100B). Further, the client(s) (120) may utilize the physical assets (160) after the physical assets (160) have been deployed, prepared, and loaded with the data backed up in the backup storage system (150).

In one or more embodiments of the invention, each client (120) is implemented as a computing device (see, e.g., FIG. 5). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the client(s) (120) described throughout this application.

In one or more embodiments of the invention, the client(s) (120) are implemented as a logical device(s). Each logical device may utilize computing resources of any number of physical computing devices to provide the functionality of the client (120) described throughout this application.

In one or more embodiments of the invention, the resource use manager (140) manages the computing resource use of the landing area devices (100A, 100B) of the landing area pool (100). In one or more embodiments of the invention, the resource use manager (140) manages the landing area device resources by performing the method of FIG. 3A to provide access of one or more landing area devices to the client(s) based on physical asset requests obtained from the client(s) (120). The resource use manager (140) further includes functionality for initiating a restoration of data stored in the backup storage system (150) to be loaded to the physical assets (160A, 160N).

In one or more embodiments of the invention, the resource use manager (140) is implemented as a computing device (see, e.g., FIG. 5). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the resource use manager (140) described in this application and/or all, or portion, of the methods illustrated in FIG. 3B.

The resource use manager (140) may be implemented as a logical device(s) without departing from the invention. The logical device(s) utilizes landing area device resources of any number of physical computing devices to provide the functionality of the resource use manager (140) described throughout this application and/or all, or portion, of the methods illustrated in FIGS. 3A-3C.

In one or more embodiments of the invention, the backup storage system (150) stores backups of data associated with the landing area devices (100A, 100B). In one or more embodiments of the invention, a backup is a copy of data to be stored in a backup storage system (150).

In one or more embodiments of the invention, a backup in the backup storage system (150) is a full backup or an incremental backup. In one or more embodiments of the invention, an incremental backup is a backup that only stores changes in the data that were made after a previous backup in the backup storage system (150). In contrast, a full backup may include all of the data in the landing area device (100A, 100B) without taking into account when the data had been modified or otherwise written to the landing area device (100A, 100B).

In one or more embodiments of the invention, if the data in the physical assets (160) is to be restored to a point in time associated with an incremental backup, the required backups needed to perform the restoration include at least: (i) the incremental backup, (ii) a full backup, and (iii) the intermediate backups (which are typically incremental backups) (if any) that are associated with points in time between the full backup and the incremental backups. In this manner, the required backups collectively include all of the data of the landing area device (100A, 100B) at the requested point in time.

In one or more embodiments of the invention, the backup storage system (150) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the backup storage system (150) described throughout this application.

In one or more embodiments of the invention, the backup storage system (150) is implemented as a logical device(s). The logical device(s) may utilize the computing resources of any number of computing devices and thereby provide the functionality of the backup storage system (150) described throughout this application.

In one or more embodiments of the invention, the physical assets (160A, 160N) are computing devices desired by the clients (120) for utilization. The physical assets (160) may be prepared and/or otherwise equipped to perform various functionalities as requested by the clients (120). The physical assets (160) may be prepared based on physical asset preparation requests initiated by the resource use manager (140) in response to physical asset requests obtained from the client (see, e.g., FIG. 3A).

In one or more embodiments of the invention, each physical asset (160A, 160N) is implemented as a computing device (see, e.g., FIG. 5). A computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the physical asset (160A, 160N) described throughout this application.

The invention is not limited to the architecture shown in FIG. 1.

Figure 2:
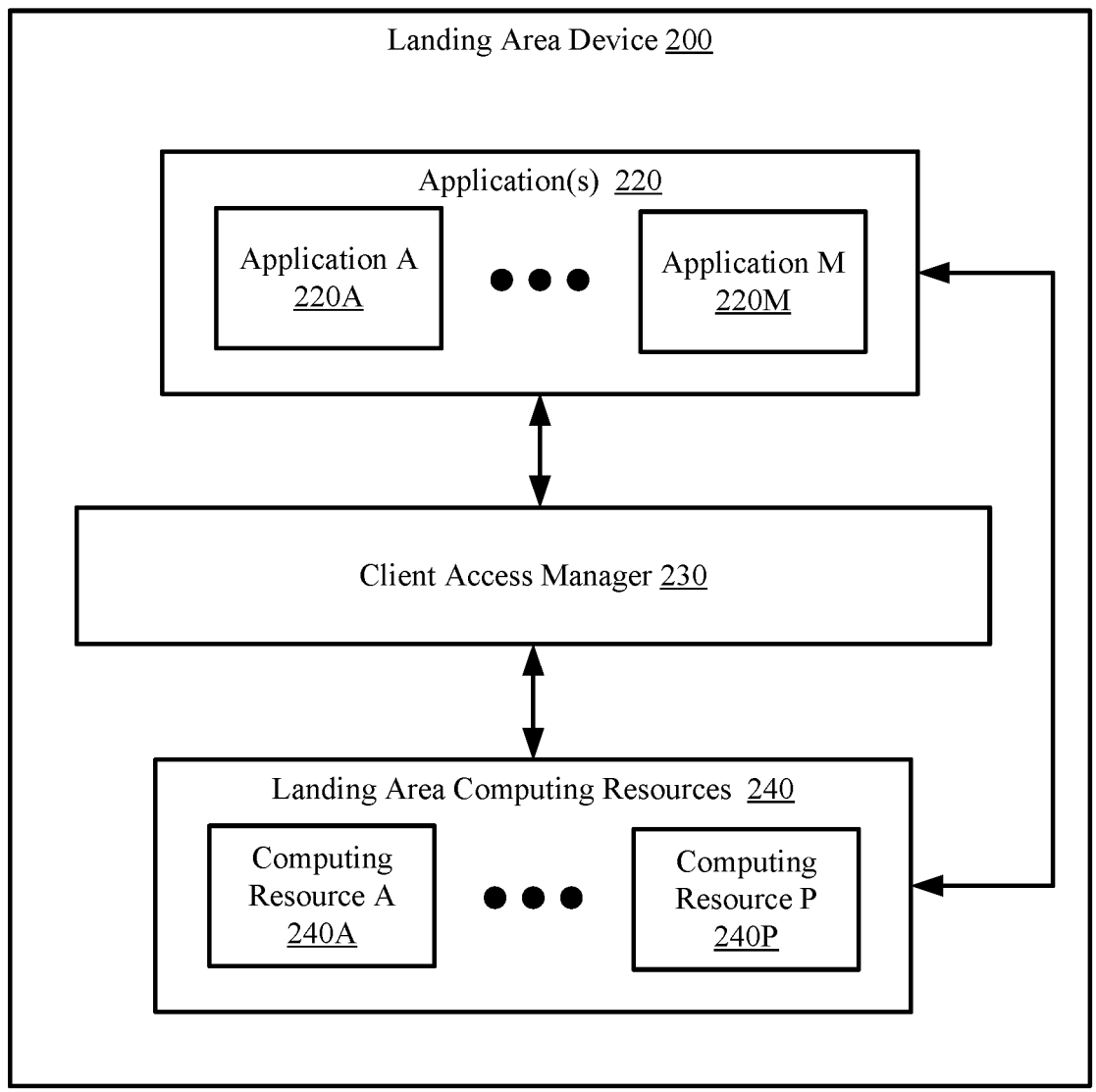
FIG. 2 shows a diagram of a landing area device in accordance with one or more embodiments of the invention.

FIG. 2 shows a diagram of a landing area device in accordance with one or more embodiments of the invention. The landing area device (200) may be an embodiment of a landing area device (100A, 100B, FIG. 1) discussed above. As discussed above, the landing area device (200) utilizes landing area device resources. The landing area device resources may include applications (220A, 220M), a client access manager (230), and computing resources (240A, 240P). The landing area device (200) may include additional, fewer, and/or different components without departing from the invention. Each of the aforementioned components is discussed below.

In one or more embodiments of the invention, the applications (220) perform services for clients (e.g., 120, FIG. 1). The services may include writing, reading, and/or otherwise modifying data that is stored in the landing area device (200). The applications (220A, 220M) may each include functionality for writing data to the landing area device (200) (e.g., using the landing area computing resources (240)). The applications may be, for example, instances of databases, email servers, and/or other applications. The applications (220A, 220M) may host other types of applications without departing from the invention.

In one or more of embodiments of the invention, each application (220A, 220M) is implemented as computer instructions, e.g., computer code, stored on a persistent storage that when executed by a processor(s) the landing area device (200) cause the landing area device (200) to provide the functionality of the applications (220A, 220M) described throughout this application.

In one or more embodiments of the invention, each application (220A, 220M) is implemented as computing code stored on a persistent storage (e.g., 230) that when executed by a processor (e.g., 240A, 240P) of the landing area device (200) performs the functionality of the application (220A, 220M). The processor may be a hardware processor including circuitry such as, for example, a central processing unit or a microcontroller. The processor may be other types of hardware devices for processing digital information without departing from the invention.

In one or more embodiments of the invention, the landing area device (200) includes a client access manager (230) that includes functionality for managing the landing area device resource use of the clients. Specifically, the client access manager (230) communicates with a resource use manager (e.g., 140, FIG. 1) to determine the clients that are to have access to the applications (220A, 220M) and/or landing area computing resources (240A, 240P). The client access manager (230) provides access to the determined clients.

In one or more embodiments of the invention, the client access manager (230) further includes functionality for monitoring the client usage of the computing resources (240A, 240P) and providing telemetry of such client usage to the resource use manager. The telemetry of the client usage may be used to determine which physical assets to provide the client.

Figure 3A:
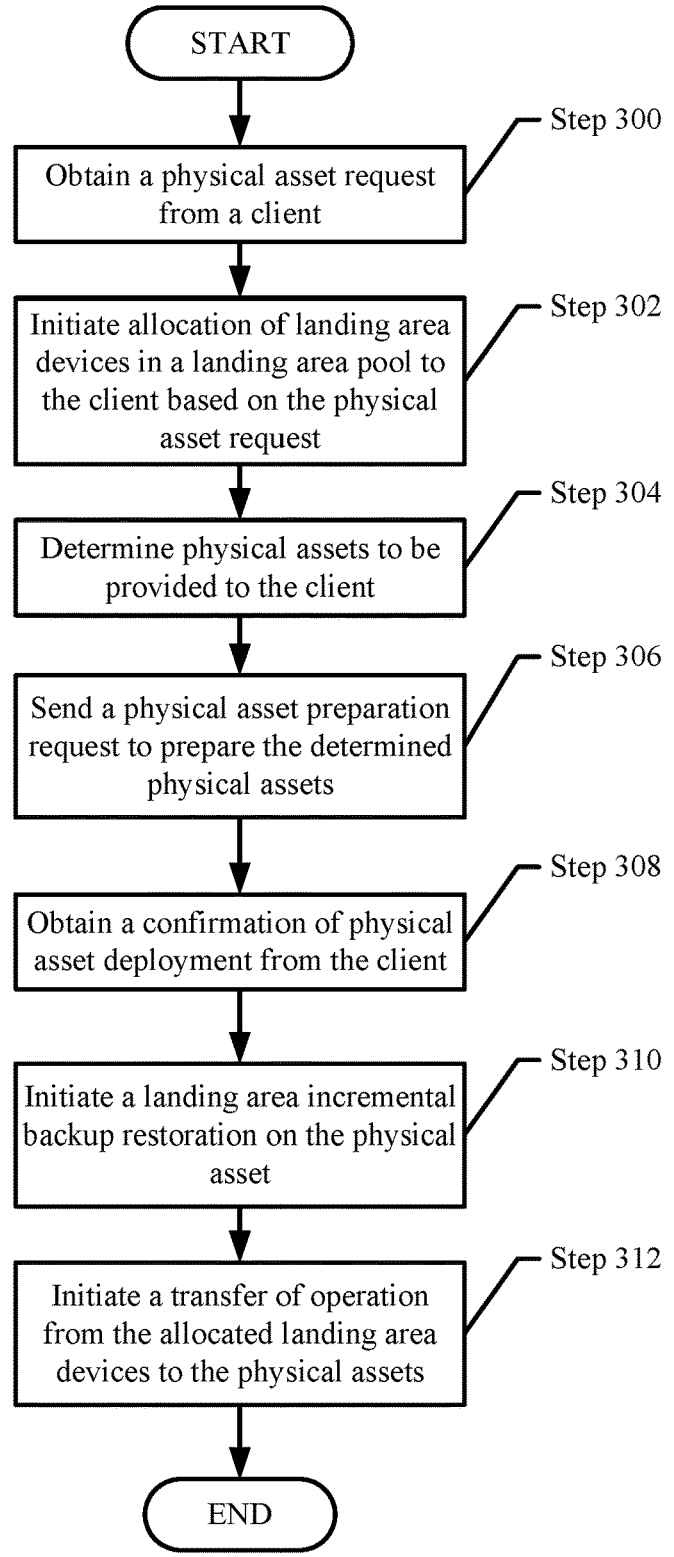
FIG. 3A shows a flowchart for servicing physical asset requests in accordance with one or more embodiments of the invention.

In one or more embodiments of the invention, the distribution manager (214) is implemented as computing code stored on a persistent storage that when executed by a processor of the landing area device (200) performs the functionality of the distribution manager (214) described throughout this application and/or all, or a portion thereof, of the method illustrated in FIG. 3A. The processor (not shown) may be a hardware processor including circuitry such as, for example, a central processing unit or a microcontroller. The processor may be other types of hardware devices for processing digital information without departing from the invention.

In one or more embodiments of the invention, the landing area computing resources (240) are hardware devices that are used by the client. The landing area device resources (240) are accessed locally (e.g., by the applications (220)) or externally (e.g., by clients (120, FIG. 1)).

In one or more embodiments of the invention, at least a portion of the landing area computing resources (240) are processors. The processors may be, for example, central processing units (CPUs) (either multi-core or single core), graphics processing units (GPUs), and/or any other types of processors without departing from the invention.

In one or more embodiments of the invention, at least a portion of the landing area computing resources (240) are memory devices. The memory devices may be, for example, random access memory (RAM), read-only memory (ROM), flash memory, and/or any other types of memory without departing from the invention.

In one or more embodiments of the invention, at least a portion of the landing area computing resources (240) are persistent storage. The persistent storage may be, for example, a solid state drive (SSD), hard-disk drives, and/or any other types of persistent storage without departing from the invention.

In one or more embodiments of the invention, at least a portion of the landing area computing resources (240) are network resources. In one or more embodiments of the invention, a network resource is a resource used to enable communication between a landing area devices (e.g., 200) and clients. The network resources may include, for example, a network interface card, a line card, an Ethernet port, a fiber optic cable with optical transceivers, a line card, and/or any other network devices, or portions thereof, without departing from the invention.

The invention may be implemented using other landing area device resources without departing from the invention.

Figure 3B:
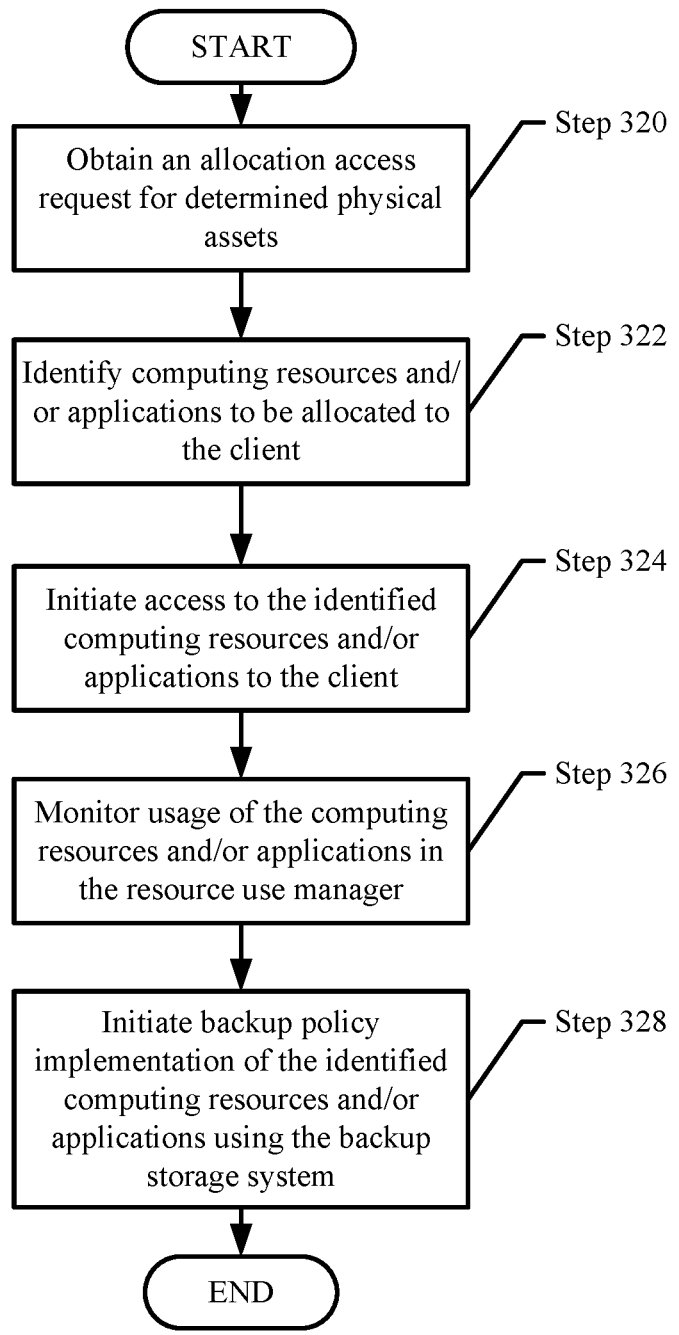
FIG. 3B shows a flowchart for allocating a landing area device to a client in accordance with one or more embodiments of the invention.
Figure 3C:
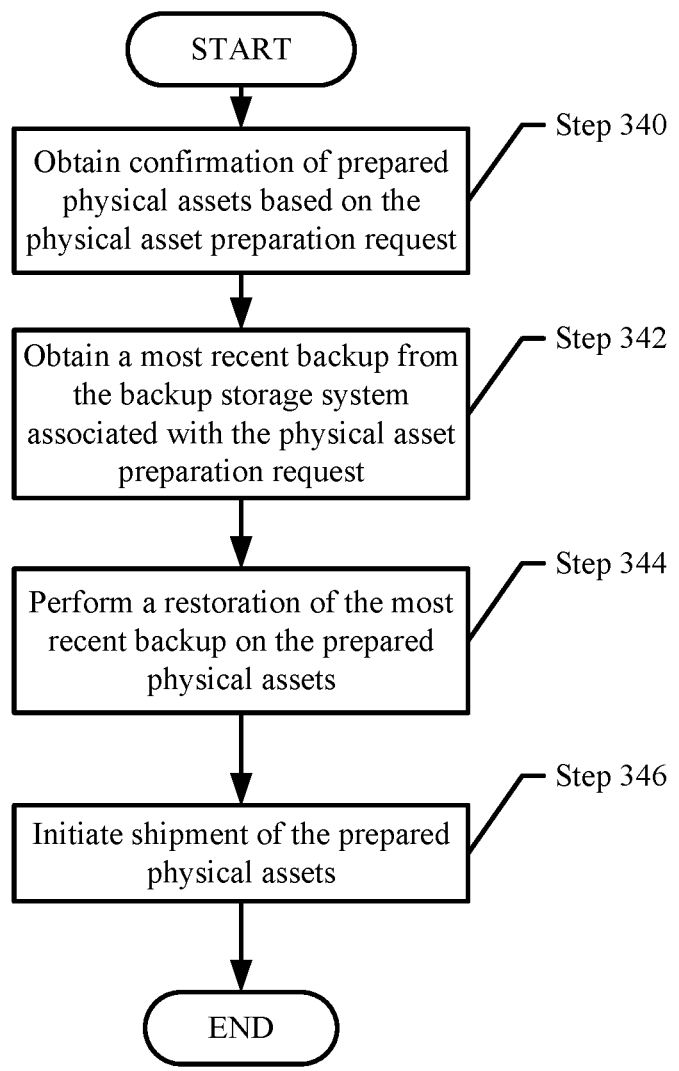
FIG. 3C shows a flowchart for preparing requested physical assets in accordance with one or more embodiments of the invention.

FIGS. 3A-3C show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 3A-3C may be performed in parallel with any other steps shown in FIGS. 3A-3C without departing from the scope of the invention.

FIG. 3A shows a flowchart for servicing physical asset requests in accordance with one or more embodiments of the invention. The method shown in FIG. 3A may be performed by, for example, a resource use manager (140, FIG. 1). Other components of the system illustrated in FIG. 1 may perform the method of FIG. 3A without departing from the invention.

Turning to FIG. 3A, in step 300, a physical asset request is obtained from a client. The physical asset request may specify the preparation, shipment, and deployment of one or more physical assets. The physical asset request may be associated with, for example, a purchase order. The preparation may include, for example, loading one or more of the physical assets with any combination of hardware and/or software designed to perform predetermined tasks. The predetermined tasks may specify, for example, performing high-level processing, large-scale storage of one or more databases, an on-premise management of data for an enterprise, and/or any other pre-determined tasks without departing from the invention. The predetermined tasks may be specified in the physical asset request.

In one or more embodiments of the invention, the physical asset request further specifies one or more applications to be installed in the physical assets.

In step 302, allocation of one or more landing area devices is initiated based on the physical asset request. In one or more embodiments of the invention, the landing area devices are allocated by identifying the computing resources and/or applications that are required to perform the functionality of the physical assets and/or applications specified in the physical asset request.

In one or more embodiments of the invention, the allocation includes sending an allocation access request to the allocated landing area device(s). The allocation access request may include allowing the client to access specified computing resources and/or applications in the landing area device(s) to the client. An indirect result of the allocation access request may be utilization of the computing resources and/or applications in the landing area device(s) by the client.

In one or more embodiments of the invention, the allocation further includes loading data from a previous physical asset to the allocated landing area devices. The previous physical asset may be a physical asset deployed prior to the physical asset request. The previous physical asset may be a physical asset that is to be replaced by the physical assets requested in the physical asset request (e.g., the previous physical asset is an older version of the requested physical assets, the previous physical asset has reached the end of its life cycle, etc.).

In one or more embodiments of the invention, the allocation further includes allocating network resources to the client. For example, a portion of the network bandwidth used by landing area devices in a landing area pool to communicate between landing area devices and between clients is provided to the client to communicate with the allocated landing area devices. In this manner, the client is provided with access to the network to access the computing resources of the landing area devices.

In step 304, physical assets to be provided to the client are determined. In one or more embodiments of the invention, the physical assets to be provided are determined based on a combination of factors such as, for example: (i) the physical asset(s) and/or application(s) specified in the physical asset request, (ii) utilization of the allocated landing area device(s) by the client, and/or (iii) previously-requested physical asset requests by the clients. The resource use manager may utilize the aforementioned factors as inputs to a machine learning algorithm that results in an output that results in a set of physical assets.

In one or more embodiments of the invention, the machine learning algorithm is a multiple linear regression algorithm. In one or more embodiments of the invention, the multiple linear regression algorithm is a function that models a linear relationship between multiple inputs (e.g., each of the aforementioned factors) and an output (e.g., a set of one or more physical assets). In various embodiments of the invention, the machine learning algorithm is customized to include the selected features (which in this embodiment correspond to the historical data points). The training data (e.g., the historical data points, the secondary source data, and the prediction usefulness) is then applied to the customized machine learning algorithm to determine the appropriate parameters. The parameters may be used as the resource prediction model.

The resource prediction model may specify, for example, a relationship between inputs such as, for example, one or more landing area devices, a time period, and/or a previous selection of physical assets.

Other machine learning algorithms may be used without departing from the invention. For example, the invention may be implemented using one of the following other machine learning algorithms without departing from the invention: Linear Regression, Logistic Regression, Decision Tree, SVM, Naive Bayes, kNN, K-Means, Random Forest, Dimensionality Reduction Algorithms, and Gradient Boosting algorithms.

In one or more embodiments of the invention, the utilization of the allocated landing area device(s) may be monitored throughout a determined period of time. The period of time may be determined by the resource use manager based on a requested accuracy for the monitored utilization. Specifically, longer periods of time result in a higher accuracy; conversely, shorter periods of time results in a lower accuracy.

In one or more embodiments of the invention, the set of physical assets determined by the resource use manager may be confirmed by the client. Specifically, the client may confirm the determined set of physical assets. Alternatively, the client may deny the determined set. In such embodiments, the resource use manager may select the initial set of physical assets specified in the physical asset request to be the determined set of physical assets.

In step 306, a physical asset preparation request is sent to prepare the determined physical assets. In one or more embodiments of the invention, the physical asset preparation request specifies the physical assets determined in step 304. The physical asset preparation request may be sent to a computing device operated by a manufacturer of the physical asset(s).

In one or more embodiments of the invention, a manufacturer is an entity that builds, generates, or otherwise prepares physical assets as specified by the resource use manager, a client, or any other entity discussed in FIG. 1.

The preparation of the physical assets may include manufacturing the physical assets, installing identified applications to the physical assets, testing the operability of the physical asset to confirm expected operability of the physical asset, and/or other operation that prepares the physical assets to include the functionality as requested by the client. The computing device obtaining the physical asset preparation request (e.g., the computing device operated by the manufacturer of the physical asset(s)) may send a confirmation of prepared physical assets to the resource use manager. The confirmation may be processed in accordance with the method of FIG. 3C. The confirmation may be processed via any other method without departing from the invention.

In one or more embodiments of the invention, the method of FIG. 3C may be triggered by step 306. The method of FIG. 3C may be performed at any point in time after step 306.

In step 308, a confirmation of physical asset deployment is obtained from the client. In one or more embodiments of the invention, after the physical asset preparation request is sent, the physical asset(s) may be prepared in accordance with FIG. 3C. The result of the preparation may be shipment of the physical assets to a location requested by the client. Further, the physical assets may be deployed (e.g., booted, plug to a power source, and prepared for operation) in the location. The client may then send a confirmation of the deployment of the physical assets to the resource use manager.

In step 310, a landing area incremental backup restoration is initiated on the physical asset. In one or more embodiments of the invention, prior to the incremental backup restoration, the physical assets are loaded with a previous backup (as discussed in FIG. 3C). The incremental backup restoration includes loading a landing area incremental backup, stored in the backup storage system, onto the physical asset(s). The landing area incremental backup may include a copy of data generated by the allocated landing area device(s) after the previous backup that was loaded onto the physical asset prior to the shipment (as discussed in FIG. 3C). The incremental backup restoration may be initiated by sending a restoration request to the landing area devices that specifies restoring the physical asset using the landing area incremental backup.

In step 312, a transfer of operation from the allocated landing area devices to the physical assets is initiated. In one or more embodiments of the invention, the transfer of operation includes transferring utilization of the landing area computing resources and/or applications to the computing resources and/or applications now installed and/or loaded on the physical assets. In this manner, the client utilizes the computing resources and/or applications of the physical assets to perform the functionality previously performed by the landing area device(s).

In one or more embodiments of the invention, the transfer of operation further includes using the landing area device(s) as a secondary backup storage system that includes all of the data and/or applications of the physical assets at a point in time prior to the transfer of operation. In this manner, if the physical assets experience any failure or are otherwise inaccessible by the client, the landing area device(s) may be used to restore the physical assets or to access the data at the point in time prior to the transfer of operation, thus increasing the availability of the data.

FIG. 3B shows a flowchart for allocating a landing area device to a client in accordance with one or more embodiments of the invention. The method shown in FIG. 3B may be performed by, for example, a landing area device (200, FIG. 2). Other components of the system illustrated in FIG. 1 or FIG. 2 may perform the method of FIG. 3B without departing from the invention.

In step 320, an allocation access request is obtained. In one or more embodiments of the invention, the allocation access request specifies allowing a client to access at least a portion of the computing resources and/or applications of the landing area device. The allocation access request may specify the client, the computing resources, the physical assets of a physical asset request, and/or the applications in the landing area device.

In step 322, computing resources and/or applications to be allocated to the client are identified. In one or more embodiments of the invention, the computing resources may be specified in the allocation access request. In such embodiments in which the computing resources and/or applications are not specified, the landing area device may identify the computing resources and/or applications based on the physical assets of the physical asset request. For example, if the physical asset request specifies using a storage array capable of storing one petabyte (PB) of data, the identified computing resources may include a set of persistent storage devices that, collectively, have a storage capability of at least one PB.

In step 324, access to the identified computing resources and/or applications by the client is initiated. In one or more embodiments of the invention, the access includes sending a notification to the client that the client is able to access the identified computing resources and/or applications. The access may further include sending private credential information that may enable the client to access the computing resources that are restricted to other computing devices that do not provide such credential information.

In step 326, usage of the computing resources and/or applications in the resource use manager is monitored. In one or more embodiments of the invention, the usage (also referred to as utilization) of the computing resources and/or applications is monitored by tracking characteristics and/or telemetry of the computing resources at, for example, periodic time intervals. The telemetry may include, for example, processor usage, storage availability, memory usage, input/output operations per second (IOPS), and/or other metrics of the computing resources and/or applications. The telemetry may be used by the resource use manager to determine the physical assets to be provided to the client (e.g., via step 304 of FIG. 3A)

In step 328, a backup policy implementation of the identified computing resources and/or applications is initiated. In one or more embodiments of the invention, the backup policy implementation includes determining a schedule for generating backups. The schedule may include a time interval in which a backup is to be generated. The backup may be a full backup or an incremental backup. The backup may include a copy of the data generated by the allocated computing resources and/or applications by the client. The backups generated may be stored in the backup storage system.

FIG. 3C shows a flowchart for preparing requested physical assets in accordance with one or more embodiments of the invention. The method shown in FIG. 3C may be performed by, for example, a resource use manager (140, FIG. 1). Other components of the system illustrated in FIG. 1 may perform the method of FIG. 3C without departing from the invention.

In step 340, confirmation of prepared physical assets is obtained based on the physical asset preparation request. In one or more embodiments of the invention, the confirmation may be obtained from the computing device operated by the manufacturer of the physical asset(s) discussed in step 306 of FIG. 3A. The prepared assets may be the physical assets specified in the physical asset preparation request discussed in FIG. 3A at a point in time after the physical assets have been prepared as requested in the physical asset preparation request.

In step 342, a most recent backup from the backup storage system associated with the physical asset preparation request is obtained. In one or more embodiments of the invention, the most recent backup is a backup generated based on the backup policy implementation initiated in FIG. 3B. The most recent backup may be a backup generated most recently and stored in the backup storage system. The most recent backup may include a copy of the data generated by the landing area device(s) allocated to the client.

In step 344, a restoration is performed on the prepared physical assets using the most recent backup. In one or more embodiments of the invention, the restoration is performed by loading the copy of the data onto the physical assets. In this manner, the physical assets include the computing resources and/or applications requested by the client and the data generated by the client using the landing area devices.

In step 346, a shipment of the prepared physical assets is initiated. In one or more embodiments of the invention, the shipment is initiated by sending a notification to a computing device operated by an entity that ships the physical assets. The notification may include shipping the physical assets, after having been loaded with the most recent backup, to a location specified by the client.

Example

Figure 4A:
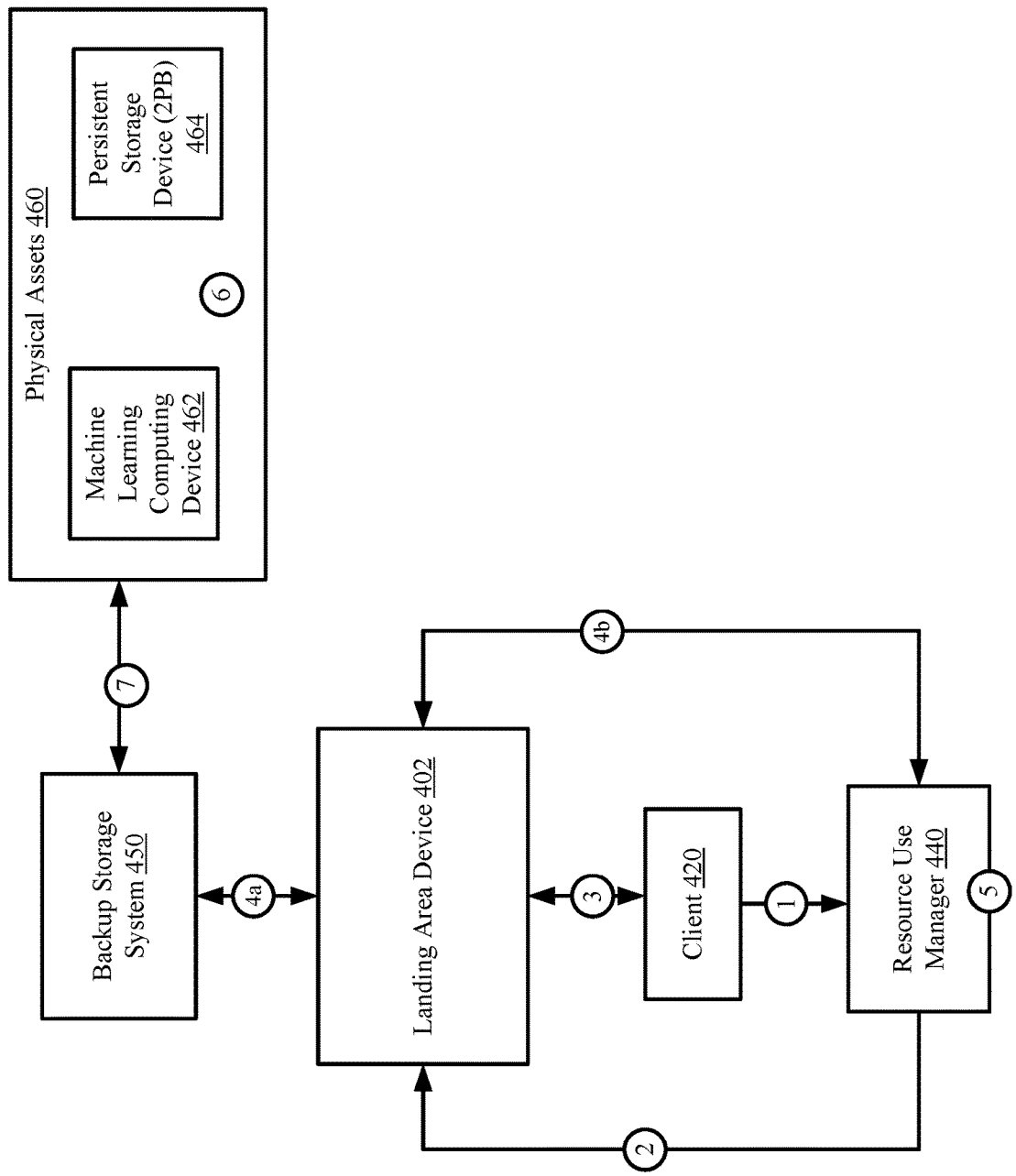
FIGS. 4A-4B show an example in accordance with one or more embodiments of the invention.
Figure 4B:
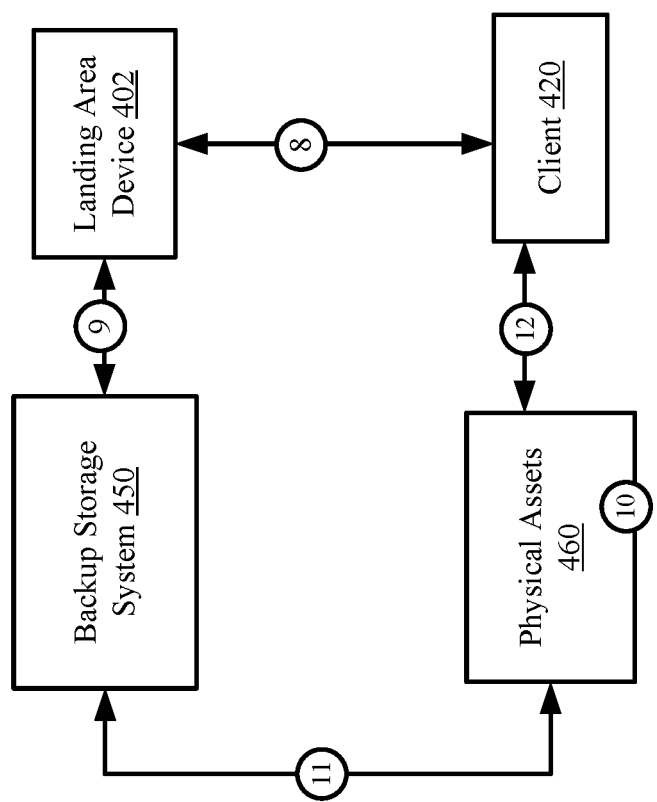

The following section describes an example. The example, illustrated in FIGS. 4A-4B, is not intended to limit the invention. Turning to the example, consider a scenario in which a client is requesting to purchase physical assets from a supplier. The physical assets may include a set of processors and persistent storage devices used to operate a machine learning environment while maintaining a digital notebook for a team of research scientists.

FIG. 4A shows an example system in accordance with one or more embodiments of the invention. For the sake of brevity, not all components of the example system may be illustrated. The example system includes a landing area device (402), a client (420), a resource use manager (440), and a backup storage system (450).

The client (420), operated by one of the research scientists, sends a physical asset request for a machine learning computing device and persistent storage device that is capable of storing and performing calculations on up to one PB of data [1]. The physical asset request may specify the machine learning computing device and the persistent storage device to be prepared and shipped to a specified location.

The resource use manager (440), in response to the physical asset request, performs the method of FIG. 3A to determine a set of physical assets to provide the client. The resource use manager (440) initiates a preparation of a machine learning computing device and a persistent storage device with a capability to store one PB of data. Further, the resource use manager sends an allocation access request to a landing area device (402) that includes allowing the client (420) to access the computing resources of the landing area device (402) that include a CPU, memory, cache, and a persistent storage system of one PB [2]. While not shown in FIG. 4A, the resource use manager (440) further sends a physical asset preparation request to a manufacturer to prepare a machine learning computing device and a persistent storage device that stores one PB of data.

In response to the allocation access request, the landing area device (402) sends a notification to the client (420) that specifies the computing resources of the client (420) that the client (420) may use while the physical assets (460) are being prepared [3].

As the client utilizes the landing area device (402) by storing training data, training a machine learning model using the training data, and using an application to perform research using the trained machine learning model, backups of the landing area data (i.e., the training data, the machine learning model, and the application) are stored in the backup storage system (450) by implementing a backup policy that specifies generating a backup of the data every day [4a].

Occurring concurrently with the backup policy implementation, the landing area device (402) provides telemetry to the resource use manager (440) that specifies how the computing resources are being used [4b]. The telemetry specifies CPU usage and total capacity usage at various points in time. The total capacity usage indicates a 90% storage capacity of the landing area device having been used by the client (420). The 90% capacity may indicate that the client (420) may require more storage than what was requested in the physical asset request. The resource use manager (440), in response to the obtained telemetry, determines that the physical assets to be provided to the client (420) are a machine learning computing device and a persistent storage device (464) that holds two PB of data [5]. The resource use manager (440) confirms this determination with the client (420). The client sends a response confirming the request for the machine learning computing device (462) and the persistent storage device (464) with higher storage capacity. The resource use manager (440) sends an additional request to the manufacture (not shown) to update the preparation of the physical assets to include the persistent storage device that holds two PB of data instead of the persistent storage device that holds one PB of data.

At a later point in time, the physical assets (460) are prepared by the manufacturer [6]. In response to the preparation of the physical assets (460), a most recent backup of the landing area data is loaded to the physical assets (460)

[7]. Specifically, the training data and any research data generated during the utilization of the landing area device (402) are stored in the persistent storage device (464). Further, the application in which the machine learning model is being executed is installed in the machine learning computing device (462). After the restoration of the landing area data onto the physical assets (460), the physical assets are shipped to the specified location.

At a later point in time, prior to the physical assets arriving at the specified location, the client (420) continues to utilize the landing area device (402). An incremental backup of the data generated after the loading is stored in the backup storage system (450) [9].

At a later point in time after the generation of the incremental backup, the physical assets (460) arrive at the specified locations and are deployed [10]. In response to the deployment of the physical assets (460), the incremental backup stored in the backup storage system (450) is loaded onto the physical assets (460). In this manner, the physical assets (460) are equipped to perform the functionality of the landing area device (402) while maintaining synchronization with the data that was stored in the landing area device (402).

Because the physical assets and the landing area device (402) are in a state of synchronization, a transfer of operation from the landing area device (402) and the physical assets may be initiated [12]. The transfer of operation may include the client (420) performing the research and data storage in the persistent storage device (464) of the physical assets (460). Further, the landing area data stored in the landing area device (402) may be used as a secondary backup storage system.

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention optimize the use of computing resources by enabling a client to temporarily perform requested functionality on a cloud environment prior to the preparation and deployment of an order for physical assets. Embodiments of the may store the data and/or software used by the client in the cloud environment (e.g., a landing area device) in a backup storage system. The data and/or software may be uploaded to the physical assets after preparation and prior to shipping.

The client may continue to utilize the computing resources of the landing area during the shipping of the ordered physical assets until the physical assets are deployed in the environment as desired by the client. In this manner, the client receives the benefit of the functionality of the physical assets before the physical assets are deployed in the desired environment. Because the physical assets may be loaded with a backup of the data generated prior to shipping, the transfer of data from the landing area to the physical assets may be minimized by only needing to upload the data that was generated after the shipping, reducing any latency in the transfer of operation to the physical assets.

Further, embodiments of the invention include using machine learning to determine the computing resources that may be best provided to the client based on the utilization of the landing area device and previous orders of physical assets.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing computing resources, the method comprising:
    obtaining, by a resource use manager, a physical asset request from a client, wherein the physical asset request specifies a physical asset to be manufactured, and wherein the physical asset comprises a processing device;
    in response to the physical asset request:
        initiating allocation of a landing area device to the client based on the physical asset request,
        wherein the result of the allocation comprises installing an application on the landing area device that provides functionality to the landing area device,
        wherein the functionality is substantially similar to a second functionality of the physical asset;

monitoring usage of the landing area device by the client;

determining a backup policy implementation based on the usage;

determining the physical asset to be provided to the client;

sending, to a manufacturer, a physical asset preparation request;

obtaining a confirmation of deployment of the physical asset from the client;

performing a restoration on the physical asset using a most recent landing area incremental backup, wherein the most recent landing area incremental back up is generated based on the backup policy implementation; and after completion of the restoration, initiating a transfer of operation from the landing area device to the physical asset.

2. The method of claim 1, further comprising:

prior to obtaining the confirmation of deployment, obtaining a second confirmation of the physical asset being prepared;

in response to the second confirmation, obtaining the most recent backup, associated with the physical asset, from a backup storage system; and performing a restoration on the physical asset using the most recent backup, wherein the most recent backup comprises first data generated by the landing area device, and wherein the most recent landing area incremental backup comprises second data generated after the most recent backup.

3. The method of claim 2, wherein the most recent backup and the most recent landing area incremental backup are generated based on the backup policy implementation.

4. The method of claim 1, wherein determining the physical asset comprises:

identifying a second physical asset specified in the physical asset request; and applying a machine learning algorithm on a set of usage telemetry and the requested physical asset to determine the physical asset.

5. The method of claim 1, wherein the most recent landing area incremental backup comprises a copy of data generated by the landing area device.

6. The method of claim 1, wherein initiating the transfer of operation comprises prompting the client to write data to the physical asset.

7. The method of claim 1, wherein initiating the allocation of the landing area device to the client comprises:

identifying a plurality of computing resources in the landing area device to be used by the client; and loading data from a previous physical asset to the landing area device.

8. A non-transitory computer readable medium comprising computer readable program code, which when executed by a computer processor enables the computer processor to perform a method, the method comprising:

obtaining, by a resource use manager, a physical asset request from a client, wherein the physical asset request specifies a physical asset to be manufactured, and wherein the physical asset comprises a processing device;

in response to the physical asset request:

initiating allocation of a landing area device to the client based on the physical asset request, wherein the result of the allocation comprises installing an application on the landing area device that provides functionality to the landing area device, wherein the functionality is substantially similar to a second functionality of the physical asset;

monitoring usage of the landing area device by the client;

determining a backup policy implementation based on the usage;

determining the physical asset to be provided to the client;

sending, to a manufacturer, a physical asset preparation request;

obtaining a confirmation of deployment of the physical asset from the client;

performing a restoration on the physical asset using a most recent landing area incremental backup, wherein the most recent landing area incremental back up is generated based on the backup policy implementation; and after completion of the restoration, initiating a transfer of operation from the landing area device to the physical asset.

9. The non-transitory computer readable medium of claim 8, the method further comprising:

prior to obtaining the confirmation of deployment, obtaining a second confirmation of the physical asset being prepared; and in response to the second confirmation, obtaining the most recent backup, associated with the physical asset, from a backup storage system; and performing a restoration on the physical asset using the most recent backup, wherein the most recent backup comprises first data generated by the landing area device, and wherein the most recent landing area incremental backup comprises second data generated after the most recent backup.

10. The non-transitory computer readable medium of claim 9, wherein the most recent backup and the most recent landing area incremental backup are generated based on the backup policy implementation.

11. The non-transitory computer readable medium of claim 8, wherein determining the physical asset comprises:

identifying a second physical asset specified in the physical asset request; and applying a machine learning algorithm on a set of usage telemetry and the requested physical asset to determine the physical asset.

12. The non-transitory computer readable medium of claim 8, wherein the most recent landing area incremental backup comprises a copy of data generated by the landing area device.

13. The non-transitory computer readable medium of claim 8, wherein initiating the transfer of operation comprises prompting the client to write data to the physical asset.

14. The non-transitory computer readable medium of claim 8, wherein initiating the allocation of the landing area device to the client comprises:

identifying a plurality of computing resources in the landing area device to be used by the client; and loading data from a previous physical asset to the landing area device.

15. A system comprising:

a processor; and memory comprising instructions which, when executed by the processor, perform a method, the method comprising:

obtaining, by a resource use manager, a physical asset request from a client, wherein the physical asset request specifies a physical asset to be manufactured, and wherein the physical asset comprises a processing device; in response to the physical asset request:

initiating allocation of a landing area device to the client based on the physical asset request, wherein the result of the allocation comprises installing an application on the landing area device that provides functionality to the landing area device, wherein the functionality is substantially similar to a second functionality of the physical asset;

monitoring usage of the landing area device by the client;

determining a backup policy implementation based on the usage;

determining the physical asset to be provided to the client;

sending, to a manufacturer, a physical asset preparation request;

obtaining a confirmation of deployment of the physical asset from the client;

performing a restoration on the physical asset using a most recent landing area incremental backup, wherein the most recent landing area incremental back up is generated based on the backup policy implementation; and after completion of the restoration, initiating a transfer of operation from the landing area device to the physical asset.

16. The system of claim 15, the method further comprising:

prior to obtaining the confirmation of deployment, obtaining a second confirmation of the physical asset being prepared; and in response to the second confirmation, obtaining the most recent backup, associated with the physical asset, from a backup storage system; and performing a restoration on the physical asset using the most recent backup, wherein the most recent backup comprises first data generated by the landing area device, and wherein the most recent landing area incremental backup comprises second data generated after the most recent backup, and wherein the most recent backup and the most recent landing area incremental backup are generated based on the backup policy implementation.

17. The system of claim 15, wherein determining the physical asset comprises:

identifying a second physical asset specified in the physical asset request; and applying a machine learning algorithm on a set of usage telemetry and the requested physical asset to determine the physical asset.

18. The system of claim 15, wherein the most recent landing area incremental backup comprises a copy of data generated by the landing area device.

19. The system of claim 15, wherein initiating the transfer of operation comprises prompting the client to write data to the physical asset.

20. The system of claim 15, wherein initiating the allocation of the landing area device to the client comprises:

identifying a plurality of computing resources in the landing area device to be used by the client; and loading data from a previous physical asset to the landing area device.

* * * * *